(12) United States Patent
Wilkens

(10) Patent No.: US 9,227,571 B1
(45) Date of Patent: Jan. 5, 2016

(54) CONSOLE TOP ORGANIZER SYSTEMS

(71) Applicant: Geralyn Wilkens, West Islip, NY (US)

(72) Inventor: Geralyn Wilkens, West Islip, NY (US)

( * ) Notice: Subject to any disclaimer, the term of this patent is extended or adjusted under 35 U.S.C. 154(b) by 0 days.

(21) Appl. No.: 14/500,301

(22) Filed: Sep. 29, 2014

Related U.S. Application Data

(60) Provisional application No. 61/884,403, filed on Sep. 30, 2013.

(51) Int. Cl.
B60R 7/00 (2006.01)
B60R 7/04 (2006.01)
B60N 3/00 (2006.01)

(52) U.S. Cl.
CPC .... *B60R 7/04* (2013.01); *B60N 3/00* (2013.01)

(58) Field of Classification Search
CPC .................................. B60R 7/04; B60N 3/00
USPC ............................................. 296/37.8, 24.34
See application file for complete search history.

(56) References Cited

U.S. PATENT DOCUMENTS

| D285,998 | S | | 10/1986 | Langensiepen | |
|---|---|---|---|---|---|
| 4,619,386 | A | | 10/1986 | Richardson | |
| 4,846,382 | A | | 7/1989 | Foultner et al. | |
| 5,279,489 | A | * | 1/1994 | Wheelock | B60N 3/101 224/926 |
| 2006/0011686 | A1 | * | 1/2006 | Latham | B60R 7/04 224/579 |

* cited by examiner

*Primary Examiner* — Joseph D Pape
(74) *Attorney, Agent, or Firm* — RG Patent Consulting, LLC; Rachel Gilboy

(57) ABSTRACT

A sturdy, compact storage container configured expressly to be easily mounted to the top of the center consoles found in most automobiles providing consumers with a simple, secure and organized means in which to store personal items such as handbags, cell phones, parking receipts and other necessities needed during travel, while also affording easy access to these items on demand.

16 Claims, 5 Drawing Sheets

CONSOLE TOP ORGANIZER SYSTEMS

CROSS-REFERENCE TO RELATED APPLICATION

The present application is related to and claims priority from prior provisional application Ser. No. 61/884,403, filed Sep. 30, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of organizers and more specifically relates to a console top organizer system.

2. Description of the Related Art

Many individuals in modern society drive vehicles for work and/or pleasure. Every day millions of consumers climb into their automobiles and head off for a day of work, school, or recreation. Whether a busy executive traveling to an important business luncheon, a homemaker dropping the kids off at a school dance, or a professional delivery man making his rounds, automobiles offer consumers a simple and efficient means of traveling from one destination to the next. Before heading off on any journey, most consumes first grab personal items needed when spending time away from home. Purses, wallets, house keys, cellular telephones, address books, cash and loose change are but a few of the countless personal items most consumers carry with when on the go. In the case of purses and other carryalls, consumers often store these on the passenger seat of the vehicle or place these objects directly on the floor. This placement is not desirable since items can be lost or damaged. Lose items during an accident may prove dangerous.

Further, these improperly stored items can easily topple over during transport, particularly as a result of sudden stops or sharp turns. Not surprisingly, when this occurs, the contents of one's purse, attaché or briefcase can spill over the floor, with objects rolling beneath the seats and in other hard to reach areas making the task of accessing these goods extremely difficult. While smaller objects such as wallets, change purses, toll tickets and the like are often stored in a center console, placing these items within these closed receptacles can make the task of accessing them when needed both challenging and dangerous because of the inherent distraction. As can be imaged, taking one's eyes off the road for even a few seconds in order to dig through a console in search of an elusive toll ticket or to answer a ringing cellular phone can result in accidents occurring, placing the driver and other motorists on the road at risk for injury or worse. This is not desirable; thus a solution is needed.

Various attempts have been made to solve the above-mentioned problems such as those found in U.S. Pat. No. 4,846,382 to Jerry L. Foultner et al; U.S. Pat. No. 4,619,386 to Jennings R. Richardson; and U.S. Design Pat. No. D285,998 to Eric Langensiepen. This art is representative of organizers. None of the above inventions and patents, taken either singly or in combination, is seen to describe the invention as claimed.

Ideally, a console top organizer system should provide a sturdy, compact storage container configured expressly to be easily mounted to the top of the center consoles and, yet would operate reliably and be manufactured at a modest expense. Thus, a need exists for a reliable console top organizer system to avoid the above-mentioned problems.

BRIEF SUMMARY OF THE INVENTION

In view of the foregoing disadvantages inherent in the known organizers art, the present invention provides a novel console top organizer system. The general purpose of the present invention, which will be described subsequently in greater detail is to provide a safe and efficient storage means for items.

A console top organizer system is disclosed herein, in a preferred embodiment, comprising: a console top organizer assembly including a housing (which is collapsible) having an outer shell, an inner volume, a top-side-wall, a bottom-side-wall, a front-side-wall, a back-side-wall, a left-side-wall, and a right-side-wall, at least one lower-fastener (means), at least one upper-fastener (means), a wire framework, at least one divider (dividing means) which is/are removable, and a plurality of inner-looped-holders; wherein the console top organizer system comprises the console top organizer assembly.

The console top organizer assembly comprises in functional combination the housing, the at least one lower-fastener, the at least one upper-fastener, the at least one divider, and the plurality of inner-looped-holders; wherein parameters of the housing are defined by the outer shell, the top-side-wall, the bottom-side-wall, the front-side-wall, the back-side-wall, the left-side-wall, and the right-side-wall all enveloping the inner volume; the inner volume is suitable for storage of items. The top-side-wall comprises a lid; wherein the lid is rotatable between open and closed conditions (by a user). In preferred embodiments the outer shell may be collapsible, alternate versions may be non-flexible. Other embodiments may be suited to allow insulative means. The outer shell in preferred embodiments comprises semi-flexible material which is also waterproof. The wire framework is comprised within the outer shell; wherein the wire framework comprises scissor-hinges; the scissor-hinges allow the housing to be (sequentially) collapsible.

The at least one lower-fastener is structured and arranged to removably fasten the housing in position for an extended period of use; wherein the lid is removably closable and openable in relation to the front-side-wall allowing access to the items stored within the inner volume within the outer shell of the housing, as desired. The lid, as mentioned, is removably closable and openable in relation to the front-side-wall via the at least one upper-fastener; wherein the at least one upper-fastener preferably comprises hook and loop fastening means (other fasteners such as snaps, or buttons or the like may be used).

The divider divides the inner volume when used (via bifurcating or the like); wherein the at least one divider comprises an insert. The housing is able to contain a plurality of the insert(s) to provide a storage-separation-means keeping the stored items separated one from the next, as desired. The inserts may be simply planar sheets or more complex-structured modular shapes up to and including parallelepiped (boxes with tops or without tops). The plurality of inner-looped-holders are structured and arranged to vertically hold the items; wherein the plurality of inner-looped-holders each preferably comprise a horizontally-oriented strap (when placed ready for use adjacent and parallel to a top of the console on which it is placed). Each the horizontally-oriented straps preferably comprises elastic; various lengths may be used to allow for storage of different diameter items and that of different cross-sections.

The console top organizer assembly is removably mountable within a vehicle via the at least one lower-fastener such that the items can be readily accessed during a travelling excursion; wherein the console top organizer assembly is removably mountable on a console (or seat or the like) within the vehicle via the at least one lower-fastener.

A kit is described including: the housing, the at least one divider, and a set of user-instructions.

A method of using a console top organizer system is also disclosed herein comprising the steps of: securing a console top organizer assembly to a console via at least one lower-fastener, inserting at least one divider, storing items in a plurality of inner-looped-holders, and closing a lid of the console top organizer assembly for travel. The method may further comprise the steps of opening the lid, removing the items as desired, and reclosing the lid (repeatedly as desired).

The present invention holds significant improvements and serves as a console top organizer system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, console top organizer system, constructed and operative according to the teachings of the present invention.

The various embodiments of the present invention will hereinafter be described in conjunction with the appended drawings, wherein like designations denote like elements.

DETAILED DESCRIPTION

Figure 1:
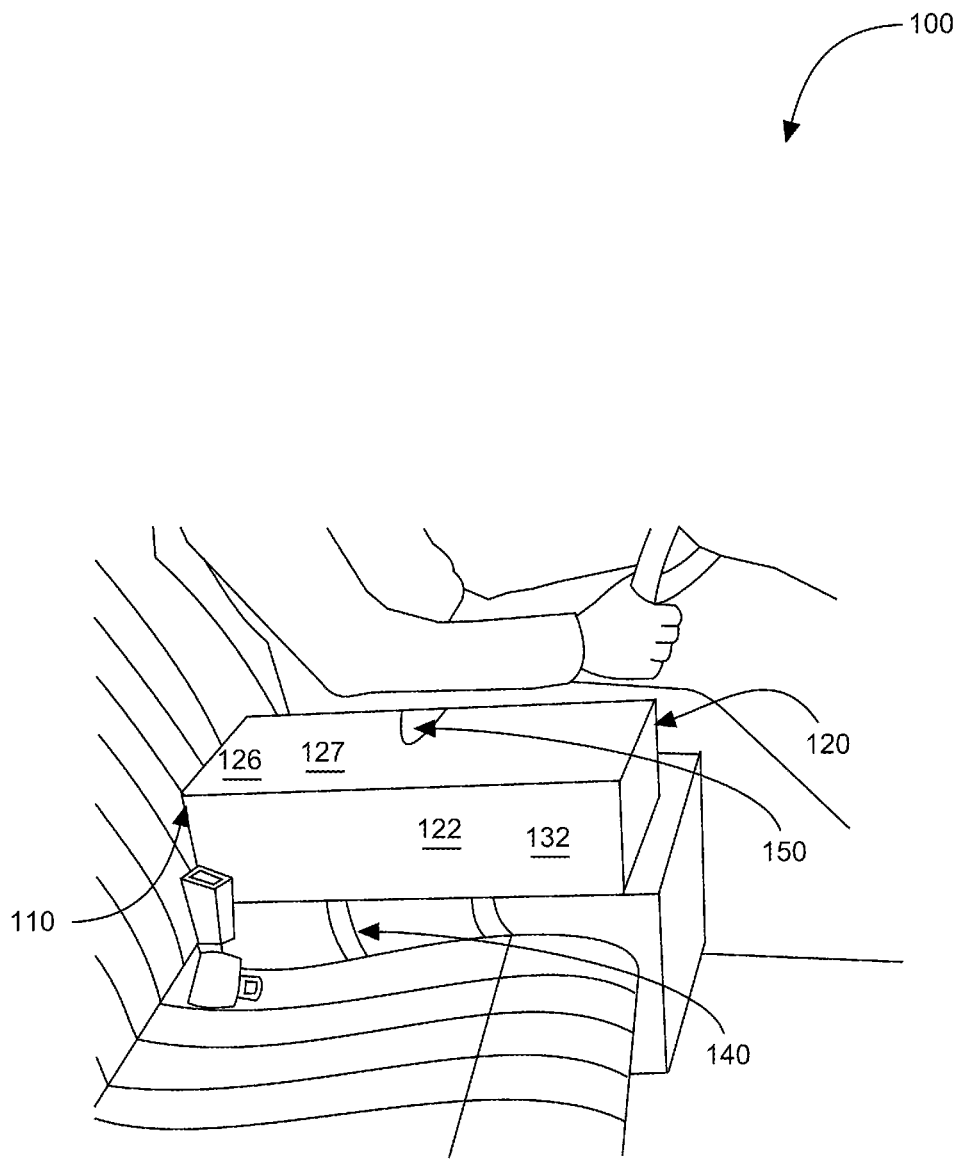
FIG. 1 shows a perspective view illustrating a console top organizer system in an in-use condition according to an embodiment of the present invention.
Figure 2:
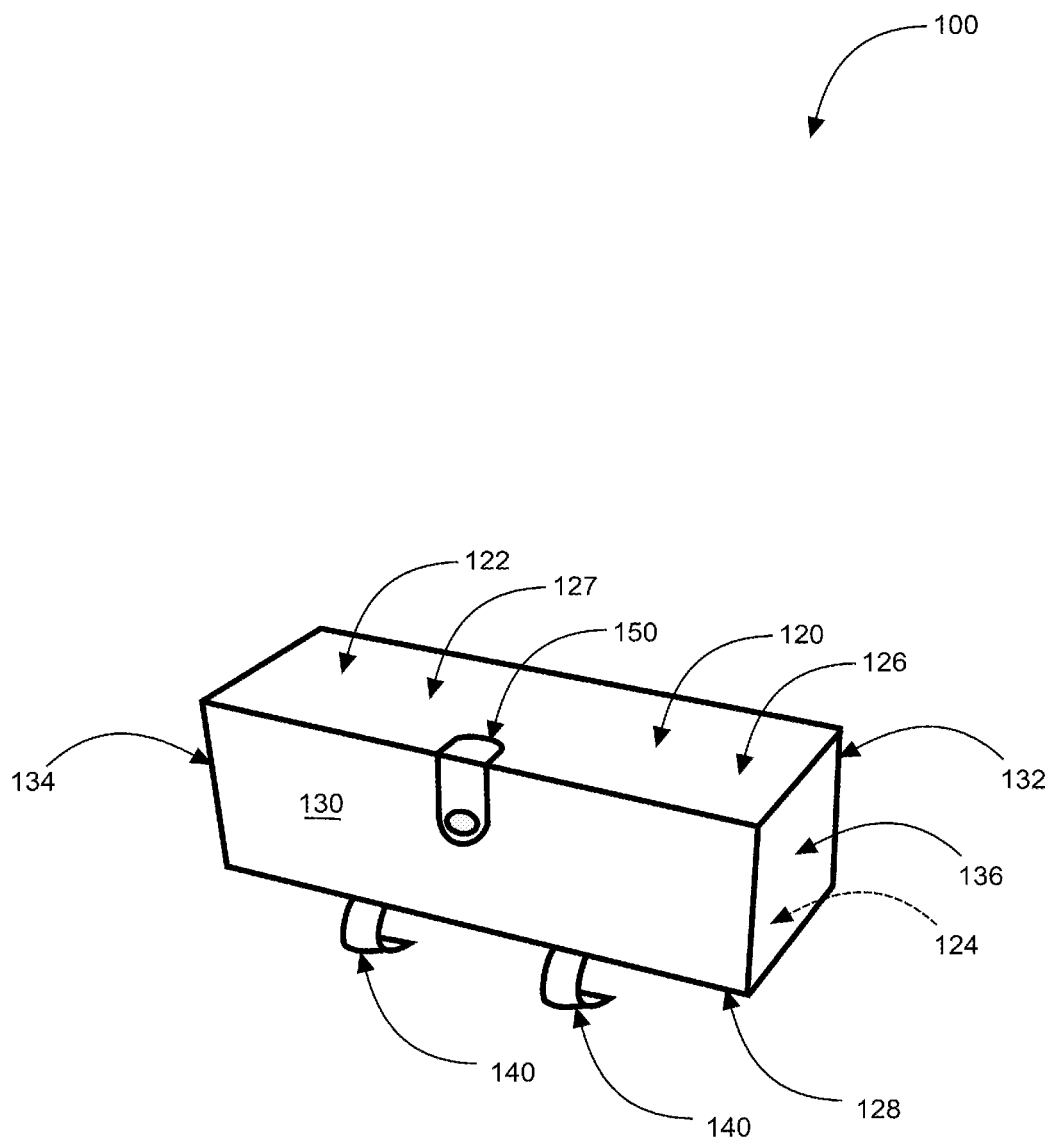
FIG. 2 is a perspective view illustrating a console top organizer assembly according to an embodiment of the present invention of FIG. 1.
Figure 3:
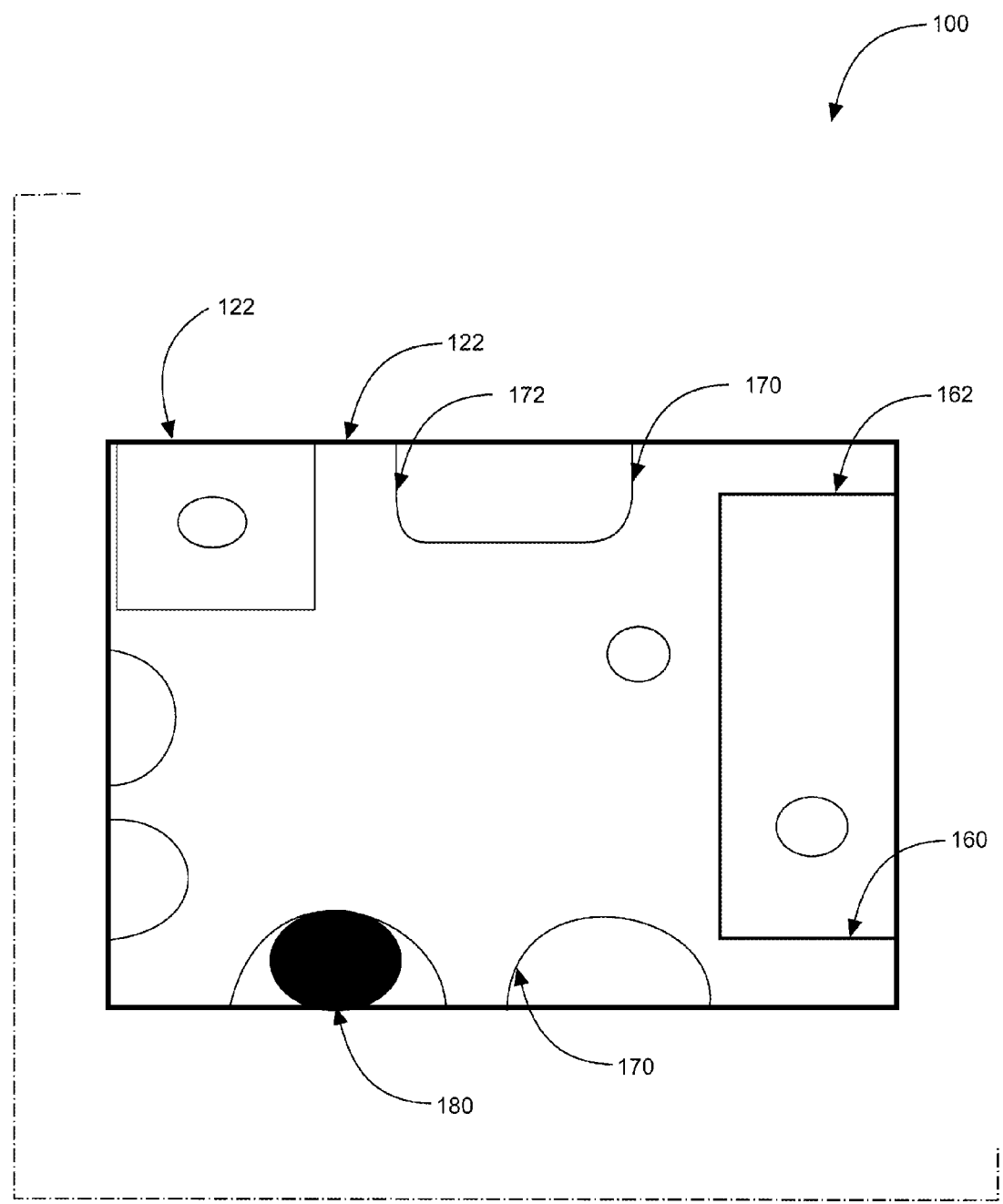
FIG. 3 is a top view illustrating the console top organizer assembly with items stored therein according to an embodiment of the present invention of FIG. 1.
Figure 4:
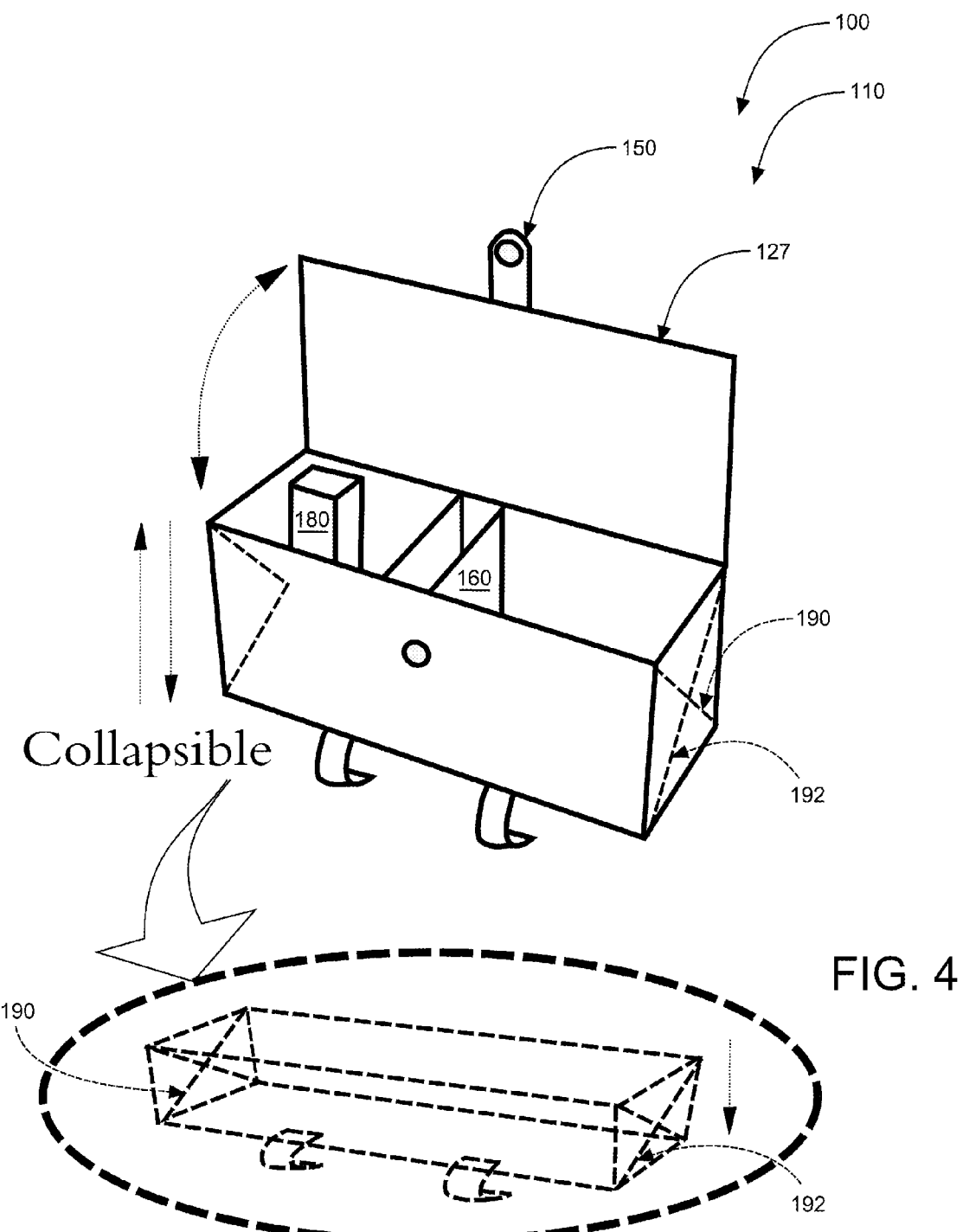
FIG. 4 is another perspective view illustrating the console top organizer assembly (as collapsible) according to an embodiment of the present invention of FIG. 1.

As discussed above, embodiments of the present invention relate to an organizing means and more particularly to a console top organizer system as used to improve the efficiency of storage.

Generally speaking, the console top organizer comprises a specially designed storage receptacle configured expressly to be mounted directly atop a storage console, providing secure and easily accessed (modular) storage for a number of personal items.

Measuring approximately 14 inches in length, approximately 6-7 inches in width and approximately 4 inches in total depth, the console top organizer may be an elongated, rectangular shaped receptacle comprising a flat base that rests directly atop the existing vehicle console. The console top organizer may comprise a sturdy wire framework that provides structural integrity to the unit, with this framework comprising "scissor" hinges incorporated into each corner of the unit framework that enables the user to collapse the device flat when not in use. The actual material that comprises the console top organizer may be a heavy duty fabric such as canvas, nylon or comparable water resistant fabric.

Integrally attached to the underside of the console top organizer and spaced several inches apart may be two, elongated and adjustable elastic strap fasteners, each preferably backed with self-affixing VELCRO® (hook and loop) and designed expressly to be secured about the existing console lid. In this manner, the console top organizer may be secured to the lid of the console via the VELCRO® (hook and loop) fasteners, yet may still be easily opened and accessed if so needed. A second set of elastic straps or simple snap fasteners may be secured to the top of the unit for use in securing the console top organizer closed if so desired.

Further, the present invention may include fitted inserts that may be offered for sale with or sold alongside the console top organizer. These two inserts of the console top organizer may be inserted within the unit side by side, encompassing the interior of the unit completely. Manufactured of lightweight plastic material, these inserts may also feature simple flip-style tops for use in securing the insert closed when not in use. Other materials may be used.

A series of integrated retaining straps (inner-looped-holders) ranging in size from small, medium and large may be affixed to the interior walls of one of these inserts and may be used to secure everything from writing implements, to tubes of lip gloss, cellular telephones, MP3 players, water bottles, eyeglass and other personal items determined by the user. The second insert may be open, thus enabling the user to store larger items such as a purse, carryall bag, shopping bag or even bag of food picked up from a restaurant drive-thru. The console top organizer may be offered in a variety of vibrant colors to complement existing vehicle interiors, as well as in understated neutral hues.

The console top organizer is an innovative product invention which may offer consumers a number of significant benefits and advantages. Foremost, the console top organizer may provide consumers with a simple and efficient means of safely storing the plethora of personal items often needed when traveling in one's vehicle. A sturdy and secure receptacle designed expressly to be mounted directly atop a vehicle console; the console top organizer may provide ample storage inside of which a wide variety of personal items may be neatly stored and easily accessed.

Ideal for storing purses, carryall bags, wallets, cellular telephones, sunglasses and other items, the console top organizer may also be employed to store loose change, writing utensils, parking receipts and other goods in a neat and reliable manner. Effectively preventing one's personal goods from shifting off a vehicle seat and falling onto the floor below, the console top organizer may spare the motorist the dangerous scenario of attempting to retrieve these items from around the vehicle pedals while operating their vehicle, or fruitlessly attempting to pick them up from far below a seat once parked. Further, with items stored atop the console as opposed to within, personal goods may be effortlessly accessed without ever having to take one's eyes off the road in order to open the console itself, a benefit that may vastly improve driver safety.

Effortlessly secured to the top of the vehicle console via two, heavy duty self-affixing strap fasteners, the console top organizer may be easily collapsed flat when not in use, thus resting flush against the top of the console and taking up minimal space. Easily popping open on demand, the console top organizer may be employed in a manner of seconds. Durably constructed, the console top organizer should withstand years of continual use.

The console top organizer is a unique product invention which may offer consumers a simple way in which to store and easily access personal items needed when traveling in a motor vehicle. Easily installed and durably constructed, this novel designed receptacle is a practical product which may prove an invaluable commodity for virtually any vehicle owner. The console top organizer should be well received by the owners and operators of motor vehicles.

Referring now to the drawings by numerals of reference there is shown in FIGS. 1-4, various views of console top organizer system 100 comprising: console top organizer assembly 110 including housing 120 (which is preferably collapsible) having outer shell 122, inner volume 124, top-side-wall 126, bottom-side-wall 128, front-side-wall 130, back-side-wall 132, left-side-wall 134, and right-side-wall 136, at least one lower-fastener 140, at least one upper-fastener 150, at least one divider 160 (which is removable), and a plurality of inner-looped-holders 170; as such console top organizer system 100 comprises top organizer assembly 110. Top organizer assembly 110 comprises in functional combination housing 120, at least one lower-fastener 140, at least one upper-fastener 150, at least one divider 160, and the plurality of inner-looped-holders 170.

The parameters of housing 120 are defined by outer shell 122, top-side-wall 126, bottom-side-wall 128, front-side-wall 130, back-side-wall 132, left-side-wall 134, and right-side-wall 136; all enveloping inner volume 124; inner volume 124 suitable for storage of items 180 such lipstick tubes, cans of juice, soda and the like. Top-side-wall 126 (as structured and arranged) comprises lid 127. Outer shell 122 is collapsible (shown in FIG. 4) in preferred embodiments via wire framework 190 such that during non-use periods it may be easily stored.

The at least one lower-fastener 140 is structured and arranged to removably fasten housing 120 in position for an extended period of use such as a (road) trip. Lid 127 is removably closable and openable in relation to front-side-wall 130 allowing access to items 180 stored within inner volume 124 within outer shell 122 of housing 120, as desired. Lid 127 is removably closable and openable in relation to front-side-wall 130 via the at least one upper-fastener(s) 150. Lid 127 is rotatable between open and closed conditions preferably via a hinged edge integral between top-side-wall 126 and back-side-wall 132.

Divider 160 (when used) divides inner volume 124; the plurality of inner-looped-holders 170 are structured and arranged to vertically hold items 180. Console top organizer assembly 110 is removably mountable within a vehicle via the at least one lower-fastener 140 such that items 180 can be readily accessed during a travelling excursion. The at least one upper-fastener 150 preferably comprises hook and loop fastening means. Other suitable fastening means such as buttons, clips, clamps, snaps, and the like may be used.

Console top organizer assembly 110 further comprises wire framework 190 in preferred embodiments. Wire framework 190 is comprised within outer shell 122; wire framework 190 preferably comprises scissor-hinges 192. Scissor-hinges 192 allow housing 120 to be collapsible. Outer shell 122 comprises flexible material such that it is collapsible after items 180 and divider(s) 160 are removed. Flexible material may be waterproof.

At least one divider 160 (when used) comprises insert 162; insert 162 may comprise a flip-top in certain embodiments. Housing 120 is able to contain a plurality of insert(s) 162 in modular combination to provide a storage-separation-means. Console top organizer assembly 110 is removably mountable on a console within the vehicle via the at least one lower-fastener 140. The plurality of inner-looped-holders 170 may each comprise horizontally-oriented strap 172. Each horizontally-oriented strap 172 preferably comprises elastic which is able to appropriately conform to item 180 being secured for travel. Insert(s) 162 may comprise a parallelepiped, non-parallelepiped shape such as a 'box' without a lid or a planar shape or the like.

Console top organizer system 100 may be sold as kit (indicated in FIG. 3) comprising the following parts: housing 120; at least one divider 160; and at least one set of user instructions. The kit has instructions such that functional relationships are detailed in relation to the structure of the invention (such that the invention can be used, maintained, or the like in a preferred manner). Console top organizer system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different divider and storage means and modular combinations, parts may be sold separately, etc., may be sufficient.

Figure 5:
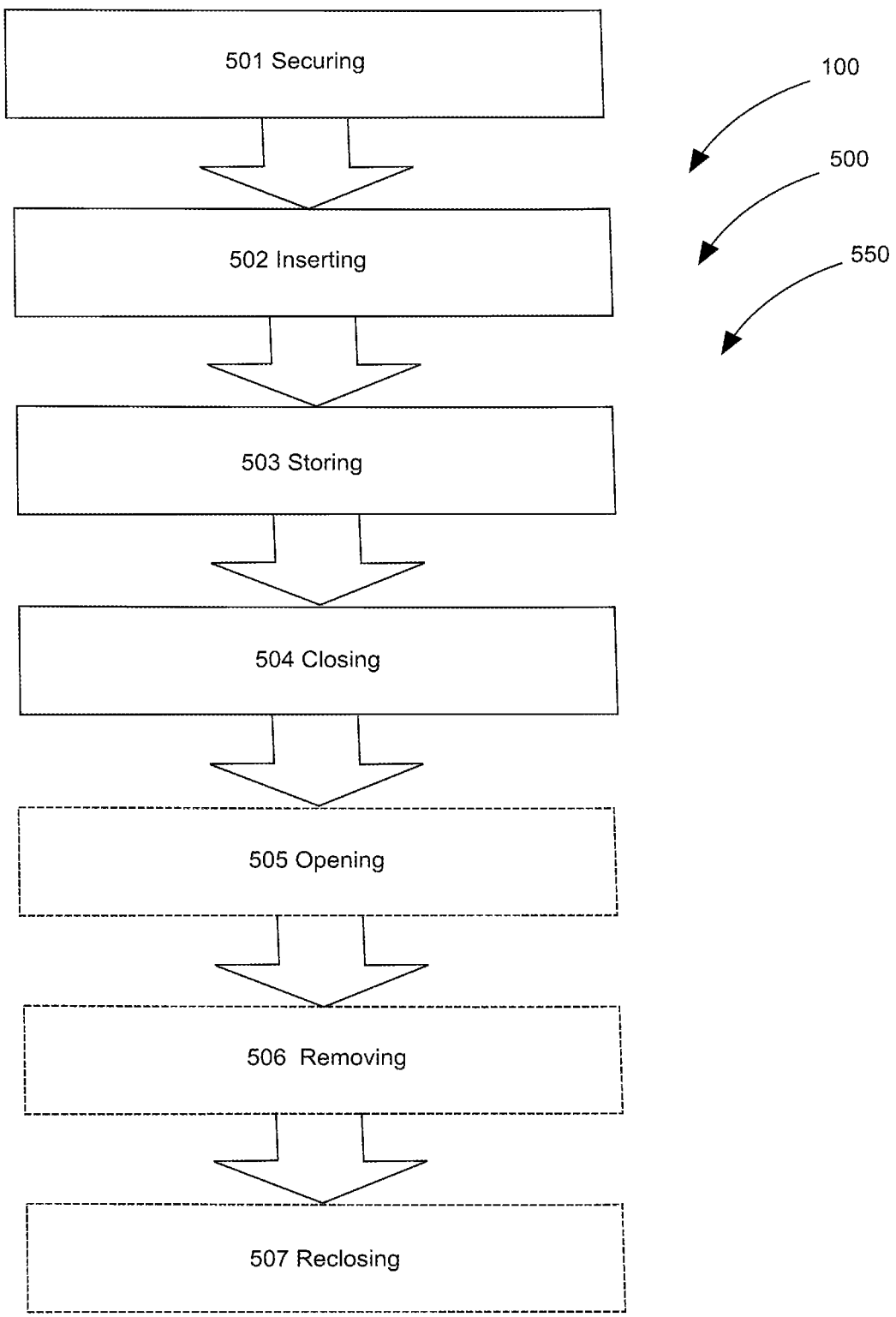
FIG. 5 is a flowchart illustrating a method of use for the console top organizer system according to an embodiment of the present invention of FIGS. 1-4.

Referring now to FIG. 5, a flowchart 550 illustrating a method of use 500 for console top organizer system 100 according to an embodiment of the present invention of FIGS. 1-4.

A method of using (method of use 500) console top organizer system 100 comprises the steps of: step one 501 securing console top organizer assembly 110 to a console via at least one lower-fastener 140, step two 502 inserting at least one divider 160, step three 503 storing items 180 in a plurality of inner-looped-holders 170, and step four 504 closing lid 127 of console top organizer assembly 110 for travel. The method 500 may further comprise the steps 505-507 (respectively) of opening lid 127, removing items 180 as desired, and reclosing lid 127.

It should be noted that steps 505-507 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A console top organizer system comprising:
   a console top organizer assembly including;
      a housing which is collapsible having;
         an outer shell;
         an inner volume;
         a top-side-wall;
         a bottom-side-wall;
         a front-side-wall;
         a back-side-wall;
         a left-side-wall;
         a right-side-wall; and
         a wire framework;
      at least one lower-fastener;
      at least one upper-fastener;
      at least one divider which is removable; and
      a plurality of inner-looped-holders;
   wherein said console top organizer system comprises said console top organizer assembly;
   wherein said console top organizer assembly comprises in functional combination said housing, said at least one lower-fastener, said at least one upper-fastener, said at least one divider, and said plurality of inner-looped-holders;
   wherein parameters of said housing are defined by said outer shell, said top-side-wall, said bottom-side-wall, said front-side-wall, said back-side-wall, said left-side-wall, and said right-side-wall all enveloping said inner volume, said inner volume suitable for storage of items;
   wherein said top-side-wall comprises a lid;
   wherein said outer shell is collapsible;
   wherein said at least one lower-fastener is structured and arranged to removably fasten said housing in position for an extended period of use;
   wherein said lid is removably closable and openable in relation to said front-side-wall allowing access to said items stored within said inner volume within said outer shell of said housing, as desired;
   wherein said lid is removably closable and openable in relation to said front-side-wall via said at least one upper-fastener;
   wherein said divider divides said inner volume when used;
   wherein said plurality of inner-looped-holders are structured and arranged to vertically hold said items; and
   wherein said console top organizer assembly is removably mountable within a vehicle via said at least one lower-fastener such that said items can be readily accessed during a travelling excursion.

2. The console top organizer system of claim 1 wherein said lid is rotatable between open and closed conditions.

3. The console top organizer system of claim 1 wherein said at least one upper-fastener comprises hook and loop fastening means.

4. The console top organizer system of claim 1 wherein said wire framework is comprised within said outer shell.

5. The console top organizer system of claim 4 wherein said wire framework comprises scissor-hinges.

6. The console top organizer system of claim 5 wherein said scissor-hinges allow said housing to be collapsible.

7. The console top organizer system of claim 6 wherein said outer shell comprises flexible material.

8. The console top organizer system of claim 7 wherein said flexible material is waterproof.

9. The console top organizer system of claim 1 wherein said at least one divider comprises an insert.

10. The console top organizer system of claim 1 wherein said console top organizer assembly is removably mountable on a console within said vehicle via said at least one lower-fastener.

11. The console top organizer system of claim 1 wherein said plurality of inner-looped-holders each comprise a horizontally-oriented strap.

12. The console top organizer system of claim 11 wherein each said horizontally-oriented strap comprises elastic.

13. The console top organizer system of claim 9 wherein said housing is able to contain a plurality of said inserts to provide a storage-separation-means.

14. The console top organizer system of claim 13 wherein said inserts comprise a parallelepiped.

15. A console top organizer system comprising:
   a console top organizer assembly including;
      a housing which is collapsible having;
         an outer shell;
         an inner volume;
         a top-side-wall;
         a bottom-side-wall;
         a front-side-wall;
         a back-side-wall;
         a left-side-wall; and
         a right-side-wall;
      at least one lower-fastener;
      at least one upper-fastener;
      a wire framework;
      at least one divider which is removable; and
      a plurality of inner-looped-holders;
   wherein said console top organizer system comprises said console top organizer assembly;
   wherein said console top organizer assembly comprises in functional combination said housing, said at least one lower-fastener, said at least one upper-fastener, said at least one divider, and said plurality of inner-looped-holders;
   wherein parameters of said housing are defined by said outer shell, said top-side-wall, said bottom-side-wall, said front-side-wall, said back-side-wall, said left-sidewall, and said right-side-wall all enveloping said inner volume, said inner volume suitable for storage of items;

wherein said top-side-wall comprises a lid;

wherein said lid is rotatable between open and closed conditions;

wherein said outer shell is collapsible;

wherein said outer shell comprises semi-flexible material which is waterproof;

wherein said wire framework is comprised within said outer shell;

wherein said wire framework comprises scissor-hinges;

wherein said scissor-hinges allow said housing to be collapsible;

wherein said at least one lower-fastener is structured and arranged to removably fasten said housing in position for an extended period of use;

wherein said lid is removably closable and openable in relation to said front-side-wall allowing access to said items stored within said inner volume within said outer shell of said housing, as desired;

wherein said lid is removably closable and openable in relation to said front-side-wall via said at least one upper-fastener;

wherein said at least one upper-fastener comprises hook and loop fastening means;

wherein said divider divides said inner volume when used;

wherein said at least one divider comprises an insert;

wherein said housing is able to contain a plurality of said inserts to provide a storage-separation-means;

wherein said plurality of inner-looped-holders are structured and arranged to vertically hold said items;

wherein said plurality of inner-looped-holders each comprise a horizontally-oriented strap;

wherein each said horizontally-oriented strap comprises elastic;

wherein said console top organizer assembly is removably mountable within a vehicle via said at least one lower-fastener such that said items can be readily accessed during a travelling excursion; and wherein said console top organizer assembly is removably mountable on a console within said vehicle via said at least one lower-fastener.

16. The console top organizer system of claim 15 further comprising a kit including:
    said housing;
    said at least one divider; and
    a set of user-instructions.

\* \* \* \* \*